United States Patent [19]
Carangelo et al.

[11] Patent Number: 5,432,336
[45] Date of Patent: Jul. 11, 1995

[54] DETECTOR SIGNAL CORRECTION METHOD AND SYSTEM

[75] Inventors: Robert M. Carangelo, Glastonbury, Conn.; Andrew J. Duran, Oviedo; Irwin Kudman, Boca Raton, both of Fla.

[73] Assignees: On-Line Technologies, Inc., East Hartford, Conn.; Graseby Electro-Optics, Inc, Orlando, Fla.

[21] Appl. No.: 224,785

[22] Filed: Apr. 8, 1994

[51] Int. Cl.⁶ .............................................. H01J 40/14
[52] U.S. Cl. ................... 250/214 L; 250/214 C
[58] Field of Search ........... 250/214 L, 214 C, 214 A, 250/214 R; 356/346, 326

[56] References Cited
U.S. PATENT DOCUMENTS

| | | | |
|---|---|---|---|
| 3,582,659 | 6/1971 | Dekker | 250/214 L |
| 3,952,205 | 4/1976 | Tobey, Jr. et al. | 250/214 L |
| 4,927,269 | 5/1990 | Keens et al. | 356/346 |
| 5,136,154 | 8/1992 | Carangelo et al. | 250/214 |
| 5,262,635 | 11/1993 | Carbelo | 250/214 R |
| 5,305,076 | 4/1994 | Inoue et al. | 356/346 |

*Primary Examiner*—David C. Nelms
*Assistant Examiner*—John R. Lee
*Attorney, Agent, or Firm*—Ira S. Dorman

[57] ABSTRACT

Corrective factors are applied so as to remove anomalous features from the signal generated by a photoconductive detector, and to thereby render the output signal highly linear with respect to the energy of incident, time-varying radiation. The corrective factors may be applied through the use of either digital electronic data processing means or analog circuitry, or through a combination of those effects.

20 Claims, 4 Drawing Sheets

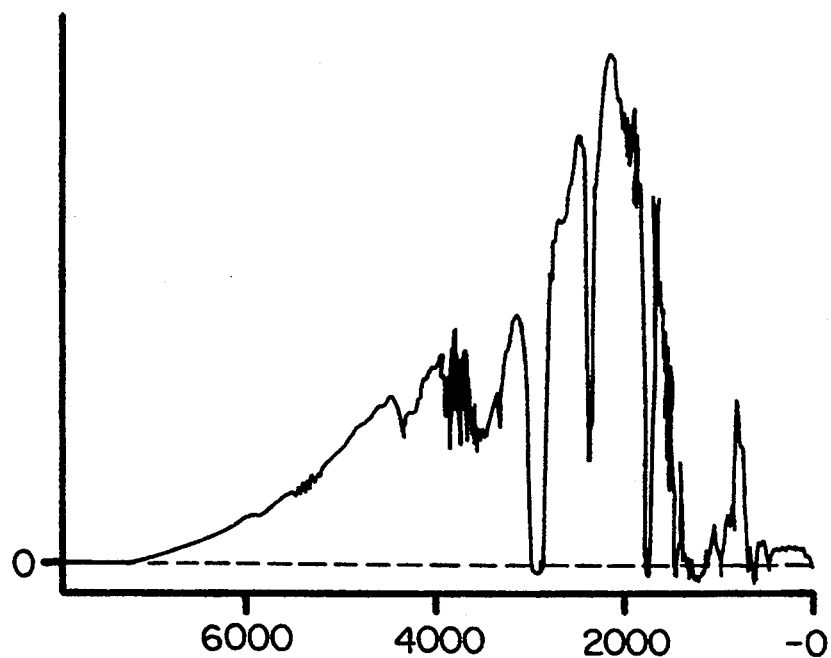
FIG. 1A WAVENUMBERS (CM-1)
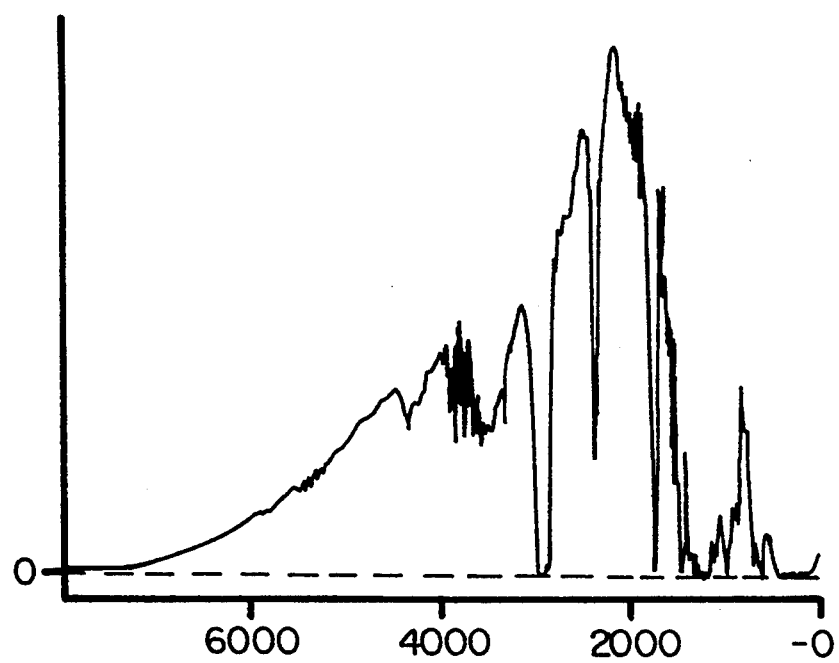
FIG. 1B WAVENUMBERS (CM-1)

DETECTOR SIGNAL CORRECTION METHOD AND SYSTEM

The United States Government has rights in this invention pursuant to Contract No. DE-AC01-88ER80561, awarded by the Department of Energy.

BACKGROUND OF THE INVENTION

It is well known that inaccuracies are often introduced into spectrometric analyses by the photoconductive detectors employed, due to nonlinearity between the electrical signal generated and the energy of the incident radiation.

A method and apparatus for correcting such nonlinearity are disclosed in Keens et al U.S. Pat. No. 4,927,269, issued May 22, 1990. Because it is predicated upon a series of somewhat arbitrary assumptions, however, the technique described by Keens et al is believed to be of only limited utility and value.

A highly effective method for correction of such detector nonlinearity, and a system implementing the same, are described and claimed in Carangelo et al U.S. Pat. No. 5,136,154. In accordance with the method thereof, a photoconductive detector, to which is applied a constant bias voltage, is used to generate an electrical signal having a time-varying value $X_s$, the value $X_s$ being indicative of the energy of electromagnetic radiation incident upon the detector but including distortions which render it nonlinearly related thereto. A corrective signal is produced having the value $(X_s-C)^2$, at least a fraction of which is added to a signal having at least the value $X_s$ so as to substantially eliminate the distortions and thereby produce a linearized output signal.

In applying the Carangelo et al method, the generated and corrective signals are generally combined in accordance with the relationship:

$$1/a \times (X_s + f[X_x - C]^2),$$

wherein "f" is a fractional constant and "a" has a value of either unity (when $X_s$ is detector output voltage), or of "f" (when $X_s$ is the A.C. portion of a modulated signal). A specific value "$f_o$" of the constant "f" is established at which, in the combined signal, the electrical distortions are substantially eliminated.

SUMMARY OF THE INVENTION

It is the broad object of the present invention to provide a highly effective, and yet incomplex, method and system for correcting the electrical signals that are generated by photoconductive detectors, so as to render the output signal substantially linear with respect to the energy of incident radiation, which method and system afford results that are further improved over those achieved by the above-mentioned Carangelo et al methodology.

A more specific object of the invention is to provide such a method and system which utilize and implement physical principles that underlie photoconductive detector response phenomena.

Another specific object is to provide such a system in which is incorporated a novel analog circuit for linearizing the photoconductive detector signal.

Related objects of the invention are to provide such a method which is facile to utilize, and to provide such a system which is relatively inexpensive to produce.

It has now been found that certain of the foregoing and related objects of the invention are attained by the provision of a method in which a photoconductive detector, to which is applied a constant bias voltage, is used to generate an electrical signal having a time-varying value $X_s$, the value $X_s$ being indicative of the energy of electromagnetic radiation incident upon the detector but including distortions which render it nonlinearly related thereto. A first corrective signal is produced having the value $(X_s-C)^2$, and a second corrective signal is produced having the value $(X_s-C)^3$. At least fractions of both corrective signals are added to a signal having at least the value $X_s$, so as to thereby substantially eliminate the distortions and produce a linearized output signal. Depending upon the nature of the signal $X_s$, the term "C" may be either zero or a numeric value with the same units as $X_s$; it will be zero when $X_s$ is the A.C. portion of a modulated signal, such as an interferogram, and it will be a reference voltage value when the signal value $X_s$ constitutes detector output voltage.

In those instances in which the generated electrical signal constitutes detector-generated voltages, the generated signal and the corrective signals will normally be combined in accordance with the relationship:

$$X_s + f(X_s-C)^2 + g(X_s-C)^3,$$

wherein "f" and "g" are fractional constants, and wherein specific values "f" and "$g_o$" of the constants "f" and "g" respectively, are established at which, in the combined signal, the distortions are substantially eliminated. In those instances in which the generated electrical signal is obtained separately as the D.C. and the A.C. portion of a modulated signal, the generated signal and the corrective signals will normally be combined in accordance with the relationship:

$$(1 + 2fX_{DC} + 3gX_{DC}^2)X_{AC} + (f + 3gX_{DC})X_{AC}^2 + gX_{AC}^3,$$

wherein "f" and "g" are fractional constants, "$X_{DC}$" and "$X_{AC}$" are the direct current and alternating current portions, respectively, of the generated signal "$X_s$", and wherein specific values "$f_o$" and "$g_o$" are established for the fractional constants "f" and "g", respectively, at which specific values distortions are substantially eliminated in the combined signal produced.

Other objects of the invention are attained by the provision of a system that includes a photoconductive detector, as hereinabove described, a "constant bias voltage" bias circuit connected to the detector, means for producing first and second corrective signals $(X_s-C)^2$ and $(X_s-C)^3$, and means for adding at least a fraction of each of the corrective signals to a signal having at least the value $X_s$. The generated and corrective signals will generally be combined in accordance with the above-stated relationships, and the system will generally include means for establishing the values of "$f_o$" and "$g_o$".

In certain embodiments of the system, the means for producing, the means for adding, and the means for establishing will comprise an analog electronic circuit connected to operate upon the detector signal. The adding means of the system, and the means for producing the values $(X_s-C)^2$ and $(X_s-C)^3$, will preferably comprise integrated circuits. The system will advantageously include a source of electromagnetic radiation, operatively disposed to project a beam upon the detector, and it will most desirably comprise a Fourier transform infrared spectrometer (FT-IR).

Further corrective signals from higher order terms, i.e., $(X_s-C)^4$, $(X_s-C)^5$, etc. and corresponding terms of the combining algorithms, e.g., $h(X_s-C)^4$, $i(X_s-C)^5$, etc., wherein "h" and "i" are fractional constants, may be employed, if so desired, to remove additional distortions from the detector signal. However, the most prominent effects, by far, are removed through the introduction of the squared and cubic signal functions, and the levels of enhancement realized by introducing additional corrective signals will generally be found quite insignificant, diminishing progressively moreover with increasing order terms. Taking into consideration space requirements for added components, together with associated heat and electrical noise factors, a practical upper limit upon the number of corrective signals employed will generally be 4 or 5.

Although not wishing to be bound by any theory of operation, it is observed that each corrective signal produced in accordance with the instant methodology is effective to eliminate nonlinearity of a particular nature, which in turn is believed to arise from a distinct mechanism that takes place within the detector crystal. The prior art does not appear to teach the presently disclosed correlations between nonlinearity and crystal mechanisms, nor does it appear to suggest that anomalous features of a generated detector signal can be corrected by impressing thereupon the polynomial function(s) newly disclosed herein.

BRIEF DESCRIPTION OF THE DRAWINGS

FIGS. 1A and 1B are spectrometer traces showing, respectively, the Fourier transform spectrum of an uncorrected photoconductive detector-generated signal, and a like spectrum of the same signal subjected to linearization in accordance with the present invention;

DETAILED DESCRIPTION OF THE PREFERRED AND ILLUSTRATED EMBODIMENTS

Figure 2:
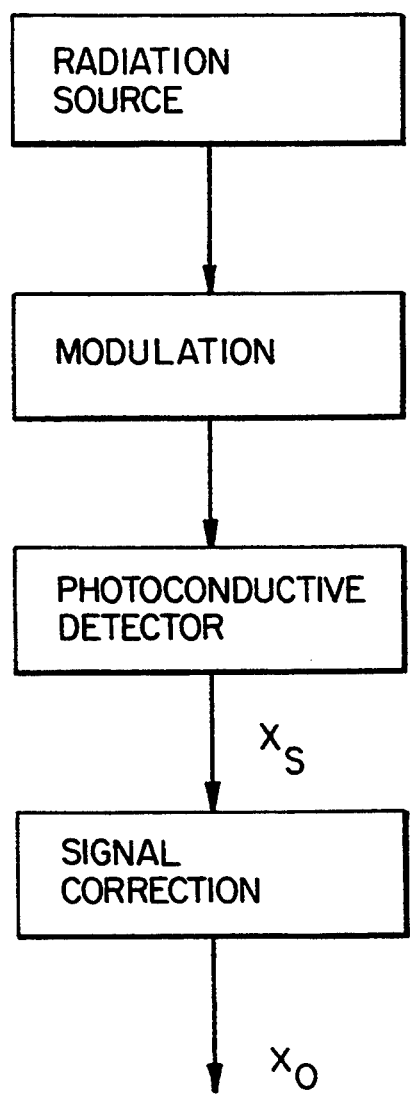
FIG. 2 is a schematic diagram of a system embodying the present invention.

Turning initially to FIGS. 1A and 1B of the appended drawings, therein illustrated are curves of signals that have been Fourier processed to produce a single beam spectrum (in the curves, the abscissa is, as indicated, in wavenumber increments; the ordinate units are arbitrary). The signal used for the transformation is an interferogram taken on a Bomem Michelson model 110 (FT-IR) spectrometer, in which is employed a mercury cadmium telluride detector having a cutoff frequency at 430 cm$^{-1}$ (i.e., being nonresponsive to radiation at lower frequencies). A commercial plastic wrap is folded to provide ten plies, and the resulting structure is held in the path of the beam from the interferometer.

FIG. 1A depicts the uncorrected signal. FIG. 1B illustrates the same signal, linearized in accordance with the present invention. As can be seen, many of the absorption features from the plastic wrap are shown in the uncorrected signal curve to dip below the zero level; this is of course an erroneous representation. In addition, the curve shows a positive signal below 430 cm$^{-1}$; i.e., at frequencies less than the detector cutoff frequency, which is of course also a false value. The curve of FIG. 1B, corrected in accordance with the instant linearization methodology, indicates that the foregoing anomalies have been eliminated.

It should be pointed out that FIGS. 1A and 1B hereof are identical to the same figures of the aforementioned Carangelo et al patent. This is so despite the substantial improvement that is achieved through the practice of the instant invention, it being appreciated that the scale of the drawing is simply insufficiently large to show the further corrective effects produced.

Figure 3:
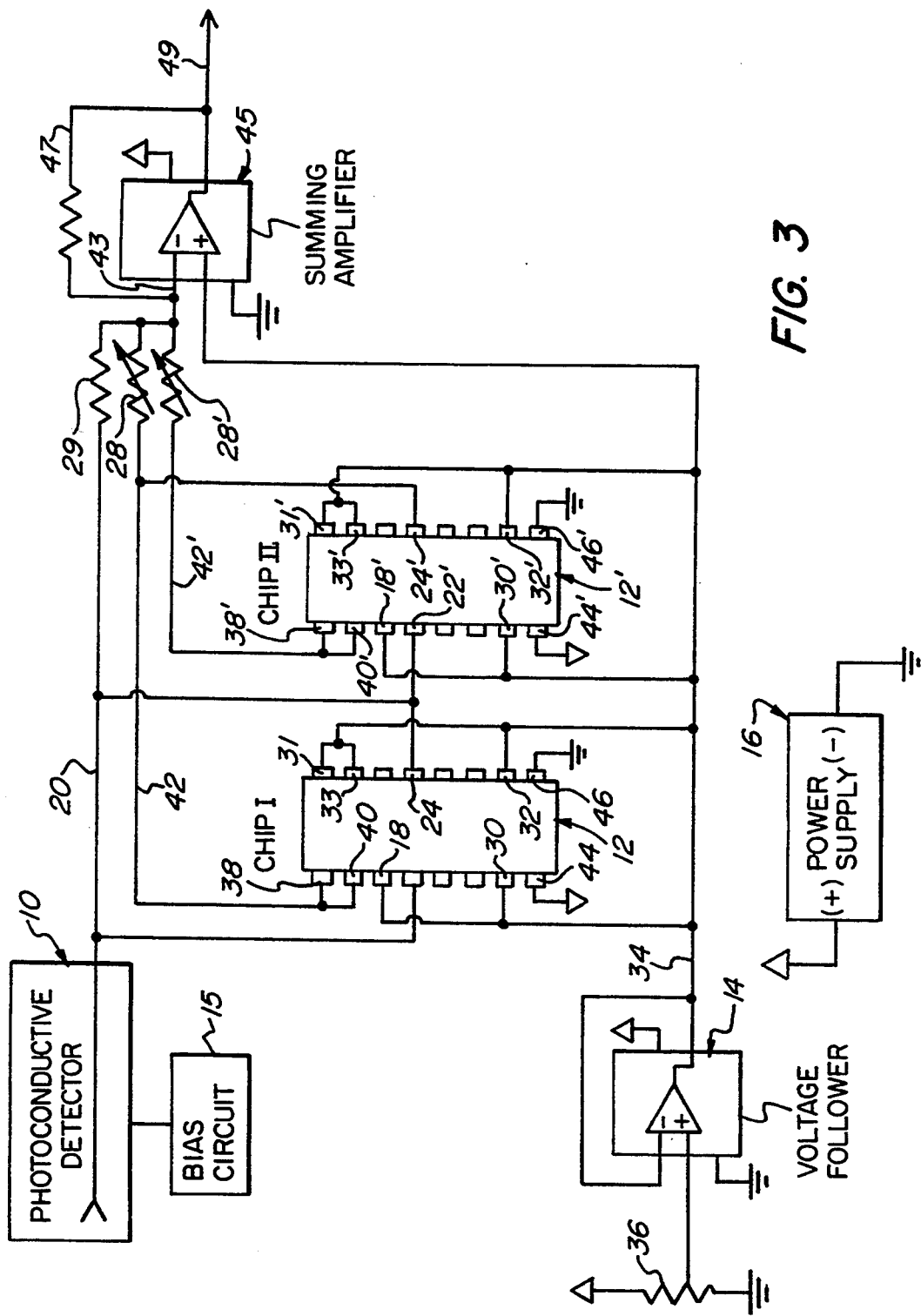
FIG. 3 is a schematic diagram illustrating an analog electronic circuit suitable for use in the system of the invention.
Figure 4:
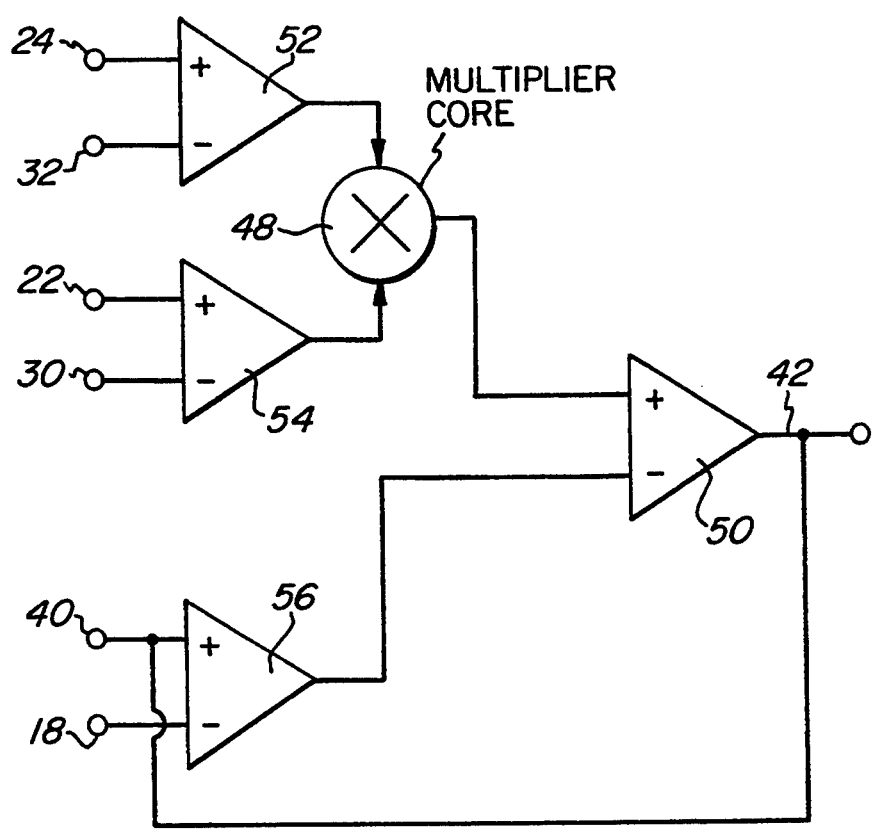
FIG. 4 is a schematic diagram showing functional features of the semiconductor chips utilized in the circuit of FIG. 3.

The system of the invention, schematically illustrated in FIG. 2, comprises a radiation source that produces a beam, which passes (by means of suitable transfer optics) through modulating means to a photoconductive detector. The electrical signal $X_s$ generated by the detector is processed by linearizing means, so as to produce an output signal $X_o$ which bears a substantially linear, distortion-free relationship to the time-varying value of radiant energy originating at the source. It will be appreciated that the modulating means may be the interferometer of an FT-IR spectrometer, and that the radiation source and linearizing means may be the IR source (e.g. globar) and computer thereof, respectively. It will also be appreciated that the source may generate electromagnetic radiation within other regions of the spectrum, and/or that is monochromatic, that the modulating means may comprise a beam chopping device, and that the linearizing means may comprise analog circuitry, such as that which is schematically illustrated in FIGS. 3 and 4.

More particularly, those Figures show an analog circuit suitable for linearizing the signal from a photoconductive detector, generally designated by the numeral 10, in implementation of the present invention; such a system is used to produce the linearized signal represented by the curve of FIG. 1B, hereinabove discussed. A bias circuit 15 is provided for applying a constant bias voltage to the detector 10, and the system additionally includes two integrated multiplier circuits (Chip I and Chip II), a voltage follower (reference supply), and a D.C. power supply, generally designated respectively by the numerals 12, 12', 14 and 16. The integrated circuits 12, 12' may each suitably be an MPY 600 chip, commercially available from Burr-Brown Research Corporation of Tuscon, Arizona, and the power supply 16 will typically have a 12-volt output.

The voltage follower 14 is utilized to generate a reference voltage ($V_r$), applied through line 34 to terminals 30, 30' and 32, 32' of the chips 12, 12' to accommodate internal voltage limits of the circuitry, as well as being applied to grounding terminals 31, 31' and 33, 33+ thereof; the reference voltage is also applied to terminals 18, 18'. The value of the reference voltage will be determined by appropriate setting of the variable resistor 36, operatively connected to the steady state power supply 16; a ground potential may be applied when appropriate, in which case the value for $V_r$ will of course be zero. Terminals 38, 38' and 40, 40' of chips 12, 12' are joined to output lines 42, 42' and the power supply 16 is connected across its terminals 44, 44' and 46, 46'. The output lines 42, 42' are connected through variable resistors 28, 28' to line 43, which is in turn connected to the negative terminal of a summing amplifier, generally designated by the numeral 45 and having a feedback loop 47 from its output line 49 and being connected across the power supply 16; the reference voltage is applied to the positive terminal of the amplifier 45.

The detector 10 is directly connected to the chip 12 at terminals 22 and 24, so as to impress its output signal voltage ($V_s$) thereupon through line 20; it is also connected to terminal 22' of chip 12' and to line 43 (through resistor 29) leading to the summing amplifier 45. Adjustments made in the resistors 28, 28' determine the values of the fractional constants "f" and "g", respectively.

The functional features of the chips 12, 12' are schematically illustrated in FIG. 4. Their transfer equation is:

$$V_o = A[(x_1 - x_2)(y_1 - y_2)/2V + (z_2 - z_1)],$$

in which "$V_o$" represents the output voltage from the chip, "A" is its amplification gain, and $x_1$, $x_2$, $y_1$, $y_2$, $z_1$, and $z_2$ are the voltages applied, respectively, at terminals 24, 32, 22, 30, 40 and 18; division of the product $(x_1 - x_2)(y_1 - y_2)$ by 2 volts is an inherent characteristic of the multiplier core 48.

Considering chip 12 initially, the output voltages from the differential amplifiers 52 and 54 both have the value ($V_s - V_r$); they are multiplied in the core 48 of the chip to produce a signal having the value ($V_s - V_r$)$^2$. From that signal is subtracted, in amplifier 50, the signal ($-V_r$) produced by amplifier 56, yielding as the output signal $V_o$ from the chip 12 a voltage having the value: $V_r + (V_s - V_r)^2$.

Correlation to the functional features of chip 12' requires only that the numbers designating the terminals in FIG. 4 be read as having prime marks applied to them. Thus, applying to terminal 24' of amplifier 52 the output signal from Chip I, having the value $V_r + (V_s - V_r)^2$, and applying $V_r$ to terminal 32', produces an amplifier output signal ($V_s - V_r$)$^2$; multiplying that quantity by ($V_s - V_r$) in core 48 generates the signal ($V_s - V_r$)$^3$; and subtracting $-V_r$ in the amplifier 50 generates a signal having the value $V_r + (V_s - V_r)^3$.

As illustrated in FIG. 3, the signals from lines 20, 42 and 42' are combined at line 43, leading to the negative terminal of summing amplifier 45, the signals carried by lines 42 and 42' passing through the variable resistors 28 and 28' by which fractional constants "f" and "g", respectively, are established and applied. Adding $V_r$ at the amplifier 45 produces a corrected signal on line 49 having a value represented by:

$$V_s + V_r + f(V_s - V_r)^2 + g(V_s - V_r)^3.$$

As will be appreciated, this satisfies substantially the generalized linearization equation: $X_s + f(X_s - C)^2 + g((X_s - C)^3$ herein set forth, where $V_3$ is $X_s$, $V_r$ is C, and f and g equal $f_o$ and $g_o$, respectively, and incorporate the divisor value of the integrated circuit transfer equation. It will be noted however that the corrected signal on line 49 contains a superfluous "$V_r$" value; that feature can of course be ignored where only the A.C. portion of the signal is used, or it can be readily eliminated if so desired.

It will be self-evident that augmentation of the analog system illustrated, for the introduction of additional signals of higher order terms to further correct the detector signal, can be readily achieved. For example, a third chip would be added to introduce a fourth-power correction, with both input terminals of the chip (e.g., terminals corresponding to 22 and 24) being connected to line 42 from Chip I, which carries the signal ($V_s - V_r$)$^2$, to generate the ($V_s - V_r$)$^4$ function. Similarly, to generate the ($V_s - V_r$)$^5$ function the signals from lines 42 and 42' would be introduced into a fourth chip. In all instances, fractional constant-establishing means (i.e., variable resistors in the form of circuitry illustrated) would of course be interposed ahead of the summing amplifier 45.

The proper values for fractional constants may be established in any of a number of ways. For example (and as illustrated with reference again to FIG. 3), a fast Fourier transform of an interferogram signal generated by the detector 10 may be displayed on an oscilloscope or video terminal, graphically calibrated so as to show the energy level of the incident radiation as a function of frequency. In the event that the signal trace shows positive energy values at frequencies lower than the known cutoff frequency of the photoconductive detector (as will commonly occur in an uncorrected signal), the resistance values of the variable resistors 28, 28' would simply be adjusted until the portion of the transform curve at wavenumbers lower than the cutoff frequency (but higher than the cutoff point of any high-pass filter that may be in the circuit) shows substantially a zero energy level. Assuming of course that the reference voltage ($V_r$) was previously set (by adjustment of the variable resistor 36) so as to accommodate the limitations of the circuit under a practical range of incident radiation intensities, such empirical setting of the values of $f_o$ and $g_o$ will effectively linearize the output signal, accurately correlating it to the time-varying intensity of electromagnetic radiation impinging upon the detector.

Alternatively, or in addition to the procedure described, a highly absorbing material may be placed in the path of the instrument beam, so as to produce strong absorption bands in the Fourier transform of the interferogram. In the event that such bands dip below the zero energy level (as will also be typical in a raw detector signal), again the value of the resistors 28, 28' may be adjusted so as to bring the aberrant portions of the curve just to the zero energy level. Having done so, the output voltage signal from the circuit will bear a highly linear relationship to the intensity of radiation impinging upon the photoconductive detector.

Another technique that may be used involves observation of the fast Fourier interferogram transform while the level of external (unmodulated, D.C.) radiation impinging upon the detector is altered. Were a truly linear relationship to exist between the internal (modulated, A.C.) radiation and the detector output signal, there would be no change in the amplitude of the observed trace, irrespective of variations in the level of external energy applied. Consequently, the voltage levels can be adjusted so as to eliminate any such amplitude variations that do appear.

In addition to the visual procedures described, it will be appreciated by those skilled in the art that analytical techniques may also be employed to establish the values of the fractional constants. Since that determination involves the elimination, or stabilization, of anomalous energy values, or of a varying proportionality constant (gain), reflected in a transformation curve, the same can be analyzed to assess the indicative data. Once having done so, the analog circuit can automatically or manually be tuned, as necessary to correct the anomalous condition.

Needless to say, such analyses, and automatic adjustments, would most effectively be carried out with the aid of electronic data processing means; the computer of which an FT-IR is comprised will of course offer a very convenient tool for that purpose. Indeed, it will be appreciated that the entire linearization procedure can be implemented by a computer method, using a program for processing (for example) an interferogram signal (I,) so as to eliminate therefrom the anomalous features hereinabove discussed. The basic operative algorithm for doing so is, as noted in the aforesaid Carangelo et al patent, that in which the raw signal (Is) is divided by a determined fractional constant "$f_o$" (producing a quotient having a value greater than Is), and is summed with the squared value $(I_s)^2$ of the signal (the term "C" of the generalized equation being zero). Proper values for the constant "$f_o$" "$g_o$", etc., can be established using the same technique, by application of the criteria described above in regard to the analog linearization circuitry, as will be evident to those skilled in the art.

It should perhaps be emphasized that the present method and system are applicable to dispersive and monochromatic spectrometers, as well to FT-IR instruments and the like. In such instances, the fractional constants may be determined using the previously described procedure in which an external source is utilized to create at least two different levels of D.C. energy radiation impinging on the detector, albeit that it may be necessary to chop the internal beam for amplitude modulation, so as to produce the required time-varying energy curve.

Analog circuitry utilized to determine the fractional constant, and/or to implement the corrective algorithm, may of course vary substantially from that which is illustrated and described herein, without departure from the concepts of the instant invention. The circuitry may be incorporated by the manufacturer into a spectrometer or into the preamplifier for a photoconductive detector, or it may be designed and built as an add-on unit. Similarly, the manner in which electronic data processing of the detector signal is effected, so as to implement the linearization algorithm and/or determine the corrective terms, will be evident to those skilled in the art and need not therefore be specifically described; suffice to say that the applicable corrective factors may be determined by a Newton-Raphson technique for iteratively converging upon the proper value.

Thus, it can be seen that the present invention provides a highly effective, and yet incomplex, improved method and system for correcting electrical signals generated by photoconductive detectors, so as to render detector response substantially linear with respect to the energy of incident radiation. The method of the invention is facile to utilize, and the apparatus is relatively inexpensive to produce.

Having thus described the invention, what is claimed is:

1. A method for producing a linearized electrical signal that is substantially linearly related to a time-varying intensity of electromagnetic radiation impinging upon a photo-conductive detector, comprising the steps:

providing a photoconductive detector for converting incident electromagnetic radiation to generate an electrical signal that is indicative of the energy of the radiation;

applying to said detector a constant bias voltage;

causing electromagnetic radiation to impinge upon said detector for a period of time, so as to generate an electrical signal having a time-varying value $X_s$ that is indicative of the energy of the impinging radiation, the generated signal including distortions which render it nonlinearly related to said impinging radiation energy;

producing a first corrective signal having the value $(X_s-C)^2$, wherein C is zero or a numerical constant of like units to $X_s$;

producing a second corrective signal having the value $(X_s-C)^3$; and adding at least a fraction of said first corrective signal value and at least a fraction of said second corrective signal value to a signal having at least the value $X_s$ so as to substantially eliminate said distortions therefrom and thereby produce a substantially linearized output signal.

2. The method of claim 1 wherein said generated electrical signal constitutes detector-generated voltages, wherein said generated and corrective signals are combined in accordance with the relationship:

$$X_s + f(X_s-C)^2 + g(X_s-C)^3,$$

wherein "f" and "g" are fractional constants, wherein specific values "$f_o$" and "$g_o$" are established for the fractional constants "f" and "g", respectively, at which specific values said distortions are substantially eliminated in the combined signal produced, and wherein C is a reference voltage.

3. The method of claim 1 wherein said generated electrical signal is obtained separately as direct current and alternating current portions of a modulated signal, wherein said generated and corrective signals are combined in accordance with the relationship:

$$(1+2fX_{DC}+3gX_{DC}^2)X_{AC}+(f+3gX_{DC})X_{AC}^2+gX_{AC}^3,$$

wherein "f" and "g" are fractional constants, "$X_{DC}$" and "$X_{AC}$" are the direct current and alternating current portions, respectively, of the generated signal "X" and wherein specific values "$f_o$" and "$g_o$" are established for the fractional constants "f" and "g", respectively, at which specific values said distortions are substantially eliminated in the combined signal produced.

4. The method of claim 3 wherein said generated signal is converted to digital form, and wherein said steps of producing said corrective signal and combining said signals are carried out by an electronic data processing technique.

5. The method of claim 3 wherein said A.C. signal portion is an interferogram.

6. The method of claim 1 wherein said steps of producing said corrective signal and combining said signals are carried out by analog electronic circuitry.

7. The method of claim 1 wherein said impinging electromagnetic radiation is spectral radiation in the infrared region.

8. The method of claim 1 comprising the further step of producing a third corrective signal having the value $(X_s-C)^4$, at least a fraction of said third corrective signal being added to said $X_s$ signal in said adding step.

9. A system for detecting incident electromagnetic radiation and producing a linearized electrical output signal that is substantially linearly related to a time-varying intensity of the incident radiation, comprising:

a photoconductive detector for converting incident electromagnetic radiation to generate an electrical signal having a time-varying value $X_s$ that is indicative of the energy of such radiation, said detector having an associate a bias circuit for applying a constant bias voltage thereto, and having characteristics that tend to introduce distortions which render the detector-generated signal nonlinearly related to the energy of the impinging radiation;

means for producing a first corrective signal having the value $(X_s-C)^2$ wherein C is zero or a numerical constant of like units to $X_s$;

means for producing a second corrective signal having the value $(X_s-C)^3$; and means for adding at least a fraction of such a first corrective signal and at least a fraction of such a second corrective signal to a signal having at least the value $X_s$, so as to produce such an output signal.

10. The system of claim 9 wherein said means for adding combines the generated and corrective signals in accordance with the relationship:

$$X_s + f(X_s-C)^2 + g(X_s-C)^3,$$

in which "f" and "g" are fractional constants; and wherein said system includes means for establishing specific values "$f_o$" and "$g_o$" of said constants "f" and "g", at which specific values the distortions are substantially eliminated in the output signal produced.

11. The system of claim 10 wherein said means for producing, said means for adding, and said means for establishing comprise analog electronic circuitry to which said detector is connected for operation upon the voltage values of the electrical signal generated by said detector, $X_s$ of said relationship representing such voltage values; and wherein means is provided for generating and applying to said circuit a reference voltage, said C term of said relationship being a constant having the value of such reference voltage.

12. The system of claim 9 wherein said generated electrical signal is obtained separately as direct current and alternating current portions of a modulated signal, wherein said means for adding combines the generated and corrective signals are combined in accordance with the relationship:

$$(1+2fX_{DC}+3gX_{DC}^2)X_{AC}+(f+3gX_{DC})X_{AC}^2+gX_{AC}^3,$$

wherein "f" and "g" are fractional constants, "$X_{DC}$" and "$X_{AC}$" are the direct current and alternating current portions, respectively, of the generated signal "$X_s$", and wherein specific values "$f_o$" and "$g_o$" are established for the fractional constants "f" and "g" respectively, at which specific values said distortions are substantially eliminated in the combined signal produced.

13. The system of claim 9 wherein said means for producing and said means for adding comprise first and second integrated circuits.

14. The system of claim 13 wherein both of said integrated circuits function in accordance with the transfer equation:

$$V_o = A[(x_1-x_2)(y_1-y_2)/B+(z_2-z_1)],$$

wherein $V_o$ is the output voltage from said integrated circuit, A is its amplification gain, B is a constant-value voltage term, and $x_1$, $x_2$, $y_1$, $y_2$, $z_1$, and $z_2$, are variable voltage values.

15. The system of claim 9 wherein said detector is a mercury cadmium telluride device.

16. The system of claim 9 wherein said system additionally includes a source of electromagnetic radiation operatively disposed to project a beam upon said detector.

17. The system of claim 16 wherein said system additionally includes interferometer means, operatively disposed in the beam path between said source and said detector.

18. The system of claim 17 wherein said electromagnetic radiation is spectral radiation, and is in the infrared region of the spectrum.

19. The system of claim 18 wherein said system comprises a Fourier transform spectrometer.

20. The system of claim 9 further comprising means for producing a third corrective signal having the value $(X_s-C)^4$, said means for adding functioning to add at least a fraction of such a third corrective signal to produce the output signal.

* * * * *

UNITED STATES PATENT AND TRADEMARK OFFICE
CERTIFICATE OF CORRECTION

PATENT NO. : 5,432,336
DATED : July 11, 1995
INVENTOR(S) : ROBERT M. CARANGELO ET AL It is certified that error appears in the above-indentified patent and that said Letters Patent is hereby corrected as shown below:

Claim 3, column 8, line 41, delete "X" and substitute "$X_s$",

Claim 12, column 9, line 43, delete "are combined"; column 10, line 9, insert a comma after "g"

Signed and Sealed this

Twenty-seventh Day of May, 1997

Attest:

BRUCE LEHMAN

*Attesting Officer*     *Commissioner of Patents and Trademarks*